(12) United States Patent
Katginari et al.

(10) Patent No.: US 10,222,394 B2
(45) Date of Patent: Mar. 5, 2019

(54) SYSTEMS AND METHODS FOR THERMALLY CONTROLLING SENSORS

(71) Applicant: InvenSense, Inc., San Jose, CA (US)

(72) Inventors: Karthik Katginari, Milpitas, CA (US); Ardalan Heshmati, San Jose, CA (US); Jianwei Shen, San Jose, CA (US)

(73) Assignee: InvenSense, Inc., San Jose, CA (US)

( * ) Notice: Subject to any disclaimer, the term of this patent is extended or adjusted under 35 U.S.C. 154(b) by 195 days.

(21) Appl. No.: 15/229,509

(22) Filed: Aug. 5, 2016

(65) Prior Publication Data

US 2017/0082648 A1 Mar. 23, 2017

Related U.S. Application Data

(60) Provisional application No. 62/222,061, filed on Sep. 22, 2015.

(51) Int. Cl.
*G01P 1/00* (2006.01)
*G01C 19/56* (2012.01)
*G01P 21/00* (2006.01)

(52) U.S. Cl.
CPC .............. *G01P 1/006* (2013.01); *G01C 19/56* (2013.01); *G01P 21/00* (2013.01)

(58) Field of Classification Search
CPC .................................. G01P 1/006; G01K 1/20
USPC ............. 73/497, 862.623; 374/133, 141, 142
See application file for complete search history.

(56) References Cited

U.S. PATENT DOCUMENTS

2006/0289415 A1* 12/2006 Muehlheim ........... B81B 7/0012
219/209

* cited by examiner

*Primary Examiner* — Benjamin R Schmitt
(74) *Attorney, Agent, or Firm* — Bay Area Technology Law Group PC

(57) ABSTRACT

A sensor is compensated by selectively activating a temperature element to drive temperature within the thermal envelope encompassing the sensor towards an operating temperature and applying a compensation to output of the sensor based at least in part on the operating temperature. The initial ambient temperature is estimated and the operating temperature is selected from a set of predetermined temperatures based on the estimate. The current ambient temperature is estimated and a new operating temperature selected when the current ambient temperature is within a threshold of the operating temperature. Correspondingly, the temperature element is selectively activated to drive temperature within the thermal envelope towards the new operating temperature and an appropriate compensation is applied to the sensor output.

20 Claims, 6 Drawing Sheets

SYSTEMS AND METHODS FOR THERMALLY CONTROLLING SENSORS

CROSS REFERENCE TO RELATED APPLICATIONS

This application claims priority from and benefit of U.S. Provisional Patent Application Ser. No. 62/222,061, filed Sep. 15, 2015, which is entitled "SYSTEMS AND SOFTWARE FOR KEEPING THE DEVICE AT NEAR CONSTANT TEMPERATURE," which is assigned to the assignee hereof and is incorporated by reference in its entirety.

FIELD OF THE PRESENT DISCLOSURE

This disclosure generally relates to sensors and more specifically to the reducing the effect of ambient temperature on sensor performance.

BACKGROUND

A wide variety of sensors may be incorporated into portable devices, such as cell phones, laptops, tablets, gaming devices and other portable, electronic devices, as well as vehicles, such as drones, or other devices capable of relative motion. Notably, information from motion sensors such as gyroscopes, accelerometers, magnetometers that measure quantities along one or more orthogonal axes may be used to determine the orientation or change in relative orientation of a device incorporating the sensor for use as a user input, to determine positional or navigational information for the device, or for other suitable purposes. Sensors may also be provided for assessing other aspects of the environment surrounding the portable device, such as sound, humidity, pressure, light, the presence of chemicals and many others.

However, due to the nature of electronics and mechanics, including their relative size and materials and methods of construction, sensors may be relatively sensitive to ambient temperature and therefore may be subject to inaccuracies or errors depending on the ambient temperature or when the ambient temperature changes. A sensor may exhibit a temperature dependent offset or bias error that reflects a non-zero component of the output that is not correlated with the quantity being measured. The sensitivity of the sensor may also be affected by temperature, requiring different compensation coefficients. If these or other temperature dependent errors are not properly compensated, the quality of sensor data may be degraded. For example, many types of sensors may be implemented using microelectromechanical systems (MEMS) that may be constructed as a semiconductor package using complementary metal oxide semiconductor (CMOS) techniques on a silicon substrate or wafer having mechanically moving elements controlled by integrated electronics. As will be appreciated, ambient temperature may affect the performance of a MEMS sensor in a number of ways, the different materials used to construct the sensor may exhibit varying coefficients of thermal expansion, which causes changes in the manner that the elements respond to the environment and interact with each other. Voltage drift and other detrimental inconsistencies may also occur due to the ambient temperature or a change in ambient temperature.

One strategy for reducing the impact of ambient temperature on sensor performance is to determine performance characteristics of the sensor at a variety of operating temperatures. Subsequently, the operating temperature of the sensor may be determined and used to apply the appropriate correction to the sensor data being output. Correspondingly, any effect on the operating temperature caused by the ambient temperature may be compensated. As a practical matter, the relationships between temperature and sensor performance may be nonlinear and vary from device to device, requiring the inefficient and time consuming process of establishing the response of the output signal to temperature variations by operating the sensor at a known temperatures and measuring the resultant output signals. For example, the sensor device may need to be placed into an oven (or refrigerator) to hold the sensor at the given operating temperature while undergoing calibration and testing. At high volume productions, such individual calibration may be prohibitive due to lengthy heating time and complex test setup procedures.

To address these difficulties, a thermally stabilized sensor featuring an feedback controlled integrated heating or cooling element may be employed to maintain the sensor at a desired temperature. By providing a more constant operating temperature that is independent of the ambient temperature, the accuracy of a sensor may be improved. Nevertheless, significant drawbacks may be associated with thermally controlled systems. For example, energy is required to activate the thermal element to maintain the sensor at an the operating temperature different than would otherwise result from a given ambient temperature. Particularly for mobile applications, power resources may be limited and the need to heat or cool a sensor can reduce the effective operating time. The temperature regulating system may also require additional hardware complexity and cost. Accordingly, it would be desirable to provide systems and methods to improve thermal control of a sensor. For example, it would be desirable to reduce the amount of energy required to maintain a selected operating temperature. Likewise, it would be desirable to reduce the complexity of the thermal control system. Further, it would be desirable to increase the range of ambient temperature at which the sensor may operate reliably. As described in the following materials, this disclosure satisfies these and other goals. Although discussed in the context of MEMS sensors, the techniques of this disclosure may be applied to other technologies to improve the performance of any sensor whose output is affected by ambient temperature.

SUMMARY

As will be described in detail below, this disclosure includes a method for compensating a sensor. The method may involve providing a sensor assembly including the sensor, a temperature sensor and a temperature element contained within a thermal envelope, selecting an operating temperature, selectively activating the temperature element to drive temperature within the thermal envelope towards the selected operating temperature, applying a first compensation to output of the sensor based at least in part on the selected operating temperature and estimating current ambient temperature based at least in part on quantifying energy supplied to the temperature element.

In one aspect, a difference between the selected operating temperature and the estimated current ambient temperature may be determined and a second compensation applied to output of the sensor based at least in part on the determined difference between selected operating temperature and estimated current ambient temperature.

In one aspect, the temperature element may be selectively activated to compensate for hysteresis.

In one aspect, selectively activating the temperature element may involve operating the temperature element at a duty cycle. Quantifying energy supplied to the temperature element may involve characterizing the duty cycle.

In one aspect, quantifying energy supplied to the temperature element may involve quantifying energy delivered to maintain the thermal envelope at the operating temperature.

In one aspect, an initial ambient temperature may be estimated based at least in part on output from the temperature sensor prior to selectively activating the temperature element. The operating temperature may be selected based at least in part on the estimated initial ambient temperature.

In one aspect, selecting the operating temperature may be based at least in part on the estimated current ambient temperature.

In one aspect, the operating temperature may be selected from a set of predetermined temperatures. The method may involve changing from a first operating temperature to a second operating temperature when the estimated current ambient temperature is within a threshold of the first operating temperature. Compensations to be applied to sensor output may be determined for each temperature of the set of predetermined temperatures.

In one aspect, the thermal element may be selectively activated to drive temperature within the thermal envelope towards a supplemental operating temperature. A calibration routine may be performed at the supplemental operating temperature to determine a compensation for the supplemental operating temperature. The compensation for the supplemental operating temperature to output of the sensor. Calibration routines may be performed at a plurality of supplemental operating temperatures to determine compensations for each of the supplemental operating temperatures.

In one aspect, the thermal element may be a heating element, a cooling element or a heating and cooling element.

In one aspect, the sensor may be an inertial sensor.

In one aspect, the sensor may be implemented using a micro electro-mechanical system (MEMS).

This disclosure also include a method for compensating a sensor that involves providing a sensor assembly including the sensor and a temperature element contained within a thermal envelope, estimating an initial ambient temperature, selecting a first operating temperature from a set of predetermined temperatures based at least in part on the initial estimated ambient temperature, selectively activating the temperature element to drive temperature within the thermal envelope towards the first operating temperature and applying a first compensation to output of the motion sensor based at least in part on the first operating temperature.

In one aspect, a current ambient temperature may be estimated and a second operating temperature selected when the estimated current ambient temperature is within a threshold of the first operating temperature so that the temperature element may be selectively activated to drive temperature within the thermal envelope towards the second operating temperature and a second compensation may be applied to output of the sensor based at least in part on the second operating temperature. Estimating the current ambient temperature may involve quantifying energy supplied to the temperature element when driving temperature within the thermal envelope towards the first operating temperature. Alternatively or in addition, estimating the current ambient temperature may involve obtaining a measurement from an auxiliary temperature sensor.

This disclosure also includes a sensor device having a sensor assembly with a sensor, a temperature sensor and a temperature element contained within a thermal envelope and a controller to select an operating temperature, selectively activate the temperature element to drive temperature within the thermal envelope towards the selected operating temperature, apply a first compensation to output of the sensor based at least in part on the selected operating temperature and estimate current ambient temperature based at least in part on quantifying energy supplied to the temperature element.

Further, this disclosure includes a sensor device having a sensor assembly including a sensor, a temperature sensor and a temperature element contained within a thermal envelope and a controller to estimate an initial ambient temperature, select a first operating temperature from a set of predetermined temperatures based at least in part on the initial estimated ambient temperature, selectively activate the temperature element to drive temperature within the thermal envelope towards the first operating temperature and apply a first compensation to output of the sensor based at least in part on the first operating temperature. The controller may also estimate a current ambient temperature, select a second operating temperature when the estimated current ambient temperature is within a threshold of the first operating temperature, selectively activate the temperature element to drive temperature within the thermal envelope towards the second operating temperature and apply a second compensation to output of the sensor based at least in part on the second operating temperature.

DETAILED DESCRIPTION

Figure 1:
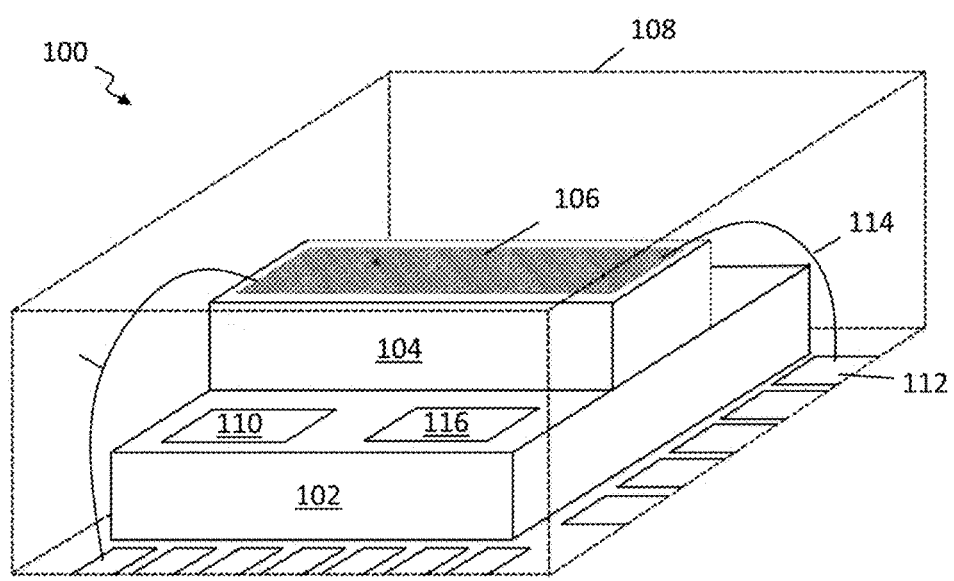
FIG. 1 is schematic diagram of a thermally controlled sensor device according to an embodiment.

At the outset, it is to be understood that this disclosure is not limited to particularly exemplified materials, architectures, routines, methods or structures as such may vary. Thus, although a number of such options, similar or equivalent to those described herein, can be used in the practice or embodiments of this disclosure, the preferred materials and methods are described herein.

It is also to be understood that the terminology used herein is for the purpose of describing particular embodiments of this disclosure only and is not intended to be limiting.

The detailed description set forth below in connection with the appended drawings is intended as a description of exemplary embodiments of the present disclosure and is not intended to represent the only exemplary embodiments in which the present disclosure can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the specification. It will be apparent to those skilled in the art that the exemplary embodiments of the specification may be practiced without these specific details. In some instances, well known structures and devices are shown in block diagram form in order to avoid obscuring the novelty of the exemplary embodiments presented herein.

For purposes of convenience and clarity only, directional terms, such as top, bottom, left, right, up, down, over, above, below, beneath, rear, back, and front, may be used with respect to the accompanying drawings or chip embodiments. These and similar directional terms should not be construed to limit the scope of the disclosure in any manner.

In this specification and in the claims, it will be understood that when an element is referred to as being "connected to" or "coupled to" another element, it can be directly connected or coupled to the other element or intervening elements may be present. In contrast, when an element is referred to as being "directly connected to" or "directly coupled to" another element, there are no intervening elements present.

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments described herein may be discussed in the general context of processor-executable instructions residing on some form of non-transitory processor-readable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the exemplary wireless communications devices may include components other than those shown, including well-known components such as a processor, memory and the like.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, performs one or more of the methods described above. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor. For example, a carrier wave may be employed to carry computer-readable electronic data such as those used in transmitting and receiving electronic mail or in accessing a network such as the Internet or a local area network (LAN). Of course, many modifications may be made to this configuration without departing from the scope or spirit of the claimed subject matter.

The various illustrative logical blocks, modules, circuits and instructions described in connection with the embodiments disclosed herein may be executed by one or more processors, such as one or more motion processing units (MPUs), digital signal processors (DSPs), general purpose microprocessors, application specific integrated circuits (ASICs), application specific instruction set processors (ASIPs), field programmable gate arrays (FPGAs), or other equivalent integrated or discrete logic circuitry. The term "processor," as used herein may refer to any of the foregoing structure or any other structure suitable for implementation of the techniques described herein. In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices, e.g., a combination of an MPU and a microprocessor, a plurality of microprocessors, one or more microprocessors in conjunction with an MPU core, or any other such configuration.

Unless defined otherwise, all technical and scientific terms used herein have the same meaning as commonly understood by one having ordinary skill in the art to which the disclosure pertains.

Finally, as used in this specification and the appended claims, the singular forms "a," "an" and "the" include plural referents unless the content clearly dictates otherwise.

As noted above, it may be desirable to operate a sensor at a selected operating temperature to reduce the effect of ambient temperature on performance. The techniques of this disclosure may include selecting an operating temperature and selectively activating a temperature element associated with the sensor to drive the temperature of the sensor towards the selected operating temperature. Correspondingly, a first compensation may be applied to output of the sensor based at least in part on the selected operating temperature. The first compensation may be predetermined for the selected operating temperature. Current ambient temperature may be estimated based at least in part on quantifying energy supplied to the temperature element. Alternatively or in addition, the selected operating temperature may be selected from a set of predetermined operating temperatures. An appropriate compensation may have been determined for each of the predetermined operating temperatures. Selecting among the predetermined operating temperatures may depend at least in part on the ambient temperature.

To help illustrate aspects of this disclosure, an exemplary MEMS-based sensor system is depicted in FIG. 1. The system 100 includes a CMOS die 102, a MEMS cap 104 coupled to the CMOS die 102, and a thermal element 106 integrated into the MEMS cap 104. The MEMS cap 104 encapsulates the MEMS sensor. In one embodiment, the thermal element 106 is integrated into a top surface of the MEMS cap 104. By activating and/or deactivating thermal element 106, the temperature of any of the MEMS cap 104, encapsulated MEMS sensor, and the CMOS die 102 can be increased and/or decreased respectively. An outer package 108 houses the CMOS die 102, the MEMS cap 104, and the thermal element 106 to provide a thermal envelope and may be insulated if desired to aid maintaining MEMS cap at a selected operating temperature that may be different than ambient temperature. System 100 may also include a temperature sensor 110 encapsulated by package 108 to provide an indication of the operating temperature of MEMS cap 104. Temperature sensor 110 may be integrated into CMOS die 102 or may be a separate element as desired, such as an external thermocouple attached to package 108. Thermal element 106 may be coupled to at least one package pad 112 coupled to the assembly of the MEMS cap 104/CMOS die 102 structure via at least one wire bond 114 or using other suitable techniques. CMOS die 102 may also implement circuitry associated with the operation and function of the sensor, including circuitry for receiving and/or processing signals output by the sensor of MEMS cap 104. Notably, CMOS die 102 may include controller circuitry 116 to receive feedback from temperature sensor 110 and selectively operate thermal element 106 to drive MEMS cap 104 towards the selected operating temperature. Techniques for regulating the temperature of sensor, applying compensations and calibration are described in commonly-assigned U.S. Pat. No. 8,686,555, issued Apr. 1, 2014, U.S. patent application Ser. No. 14/578,312, filed Dec. 19, 2014, and U.S. Patent Provisional Application Ser. No. 62/270,490, filed Dec. 21, 2015, and the disclosures of each are incorporated herein by reference.

As will be appreciated, thermal element 106 may be configured to function as a heater and/or cooler. For example, thermal element 106 may be a resistive heating element that outputs heat based on the flow of current through the element, although in other embodiment thermal element 106 may provide heating and cooling as desired, such as a Peltier element, or may function as only as a cooling element. Depending on whether thermal element 106 heats, cools or both, an operating temperature may be selected that is different from ambient temperature, either above or below as warranted, and thermal element 106 may be selectively activated to drive the operating temperature of system 100 towards the selected operating temperature.

As noted, in some embodiments thermal element 106 is activated by applying a current through two terminals of the thermal element 106, increasing the temperature of the thermal element 106 through Joule heating and correspondingly increasing the temperature of MEMS cap 104 and CMOS die 102 coupled to MEMS cap 104. The high thermal conductivity of the silicon components of the system 100 and the small masses involved in the system 100 results in a time constant that is very small including but not limited to the order of milliseconds. Accordingly, system 100 may rapidly be adjusted by thermal element 106. Similar principles may be applied when thermal element 106 is configured to cool MEMS cap 104 and CMOS die 102. One of ordinary skill in the art readily recognizes that the thermal element 106 can be integrated into the MEMS cap 104 during production of the system 100 or post-production by an end-user and that would be within the spirit and scope of the present invention. In one embodiment, the MEMS cap 104 is made of a variety of materials including but not limited to silicon.

As shown, a two terminal thermal element 106 may be integrated with the MEMS cap 104 to function as a resistive heater, which may be integrated into the MEMS cap by any suitable technique, including but not limited to micromachining and screen printing methodologies. For example, the resistive heater may be an aluminum film deposited into a top surface of the MEMS cap, or may comprises any material that conducts or semi-conducts current including but not limited to polysilicon, various metals, various metallic silicides, and other silicon based films, and resistive patches. In another embodiment, the resistive heater is a high resistance material including but not limited to a polymer with metal dust. The resistance and associated heat output of thermal element 106 may reflect other design characteristics, such as by providing one or more cuts of desired depths to separate thermal element 106 into portion, causing current to flow through MEMS cap 104 to bridge the discontinuities. In other embodiments, thermal element 106 may be configured as a heater comprising aluminum layers lithographically patterned on a top surface of MEMS cap 104.

Figure 2:
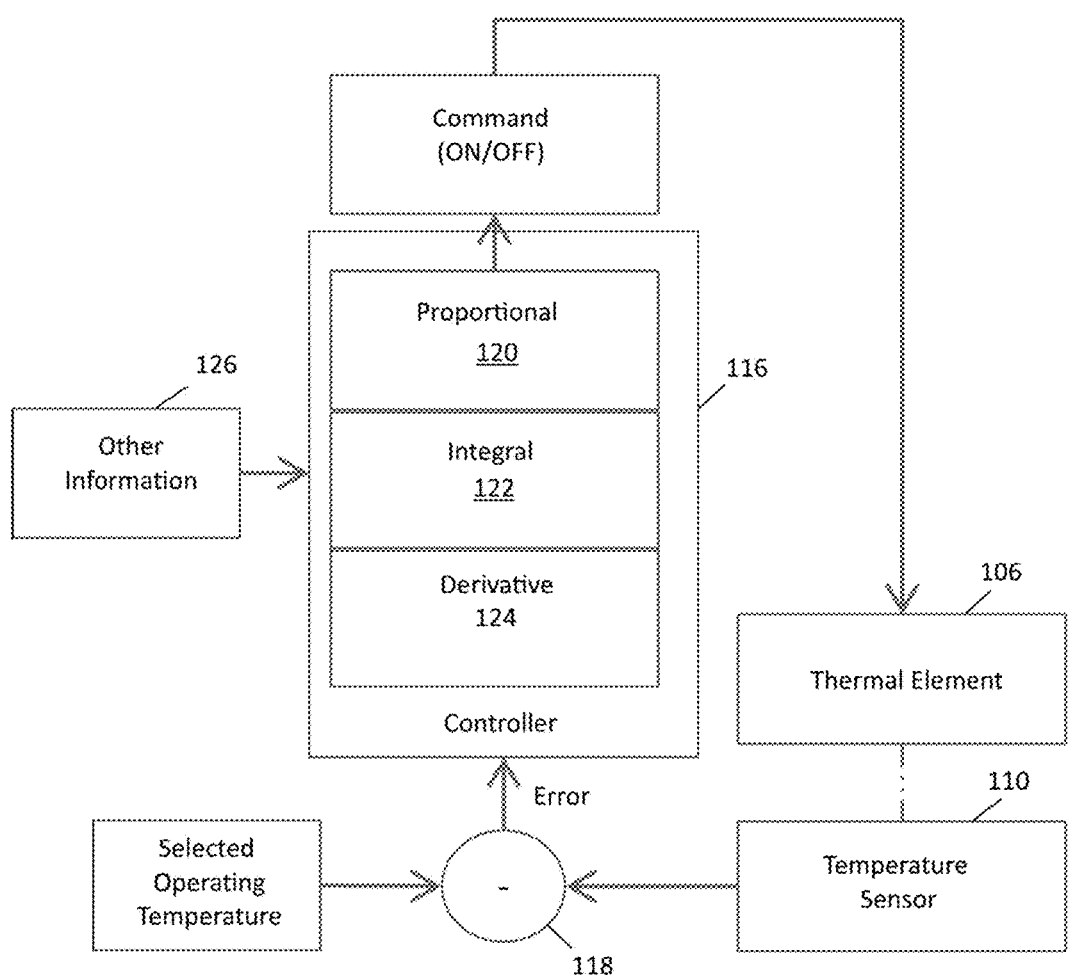
FIG. 2 is schematically depicts feedback control of thermally controlled sensor device according to an embodiment.

One suitable architecture employing controller 116 is schematically shown in FIG. 2. The difference between output from temperature sensor 110 and the selected operating temperature is determined by comparator 118 to produce an error signal that is fed to controller 116. As noted above, controller 116 may be implemented by CMOS die 102, and may use any desired combination of hardware, software and firmware. For example, controller 116 may include instructions stored in non-transitory memory that may be executed by a processor. As shown, controller 116 may be configured to output an ON or OFF command to thermal element 106 based on feedback from temperature sensor 110 to minimize the error signal. In this embodiment, controller 116 may implement proportional block 120 (P), integral block 122 (I) and derivative block 124 (D) to form a PID feedback loop as known in the art. Proportional block 120 may be configured to react to the present error signal to provide a command output that reflects the degree of difference between the selected operating temperature and the sensed temperature. Integral block 122 may be configured to reflect past operation of controller 116, so that an accumulating error signal may result in a greater response. Derivative block 124 may be configured to use the current rate of change to estimate future output of temperature sensor 110. The parameters associated with each of these blocks may be tuned to adjust the overall behavior of controller 116, including the speed of response to error, the amount of overshoot that may occur, temperature oscillation and others. For example, the PID parameters may be configured to account for hysteresis that the system may exhibit. Other suitable control schemes may also be used as desired. Further, controller 116 may also employ other information from source 126 that may influence the temperature response of system 100. For example, in UAV applications, different locations, heights, weather, wind-speed, propeller speed and factors may affect the temperature of system 100, and this information may be obtained from the appropriate sensor or from the control system of the UAV. In other applications, one of ordinary skill in the art will appreciate that any information that may change the expected thermal response of package 108 may be employed to adjust the operation of controller 116 as desired.

Figure 3:
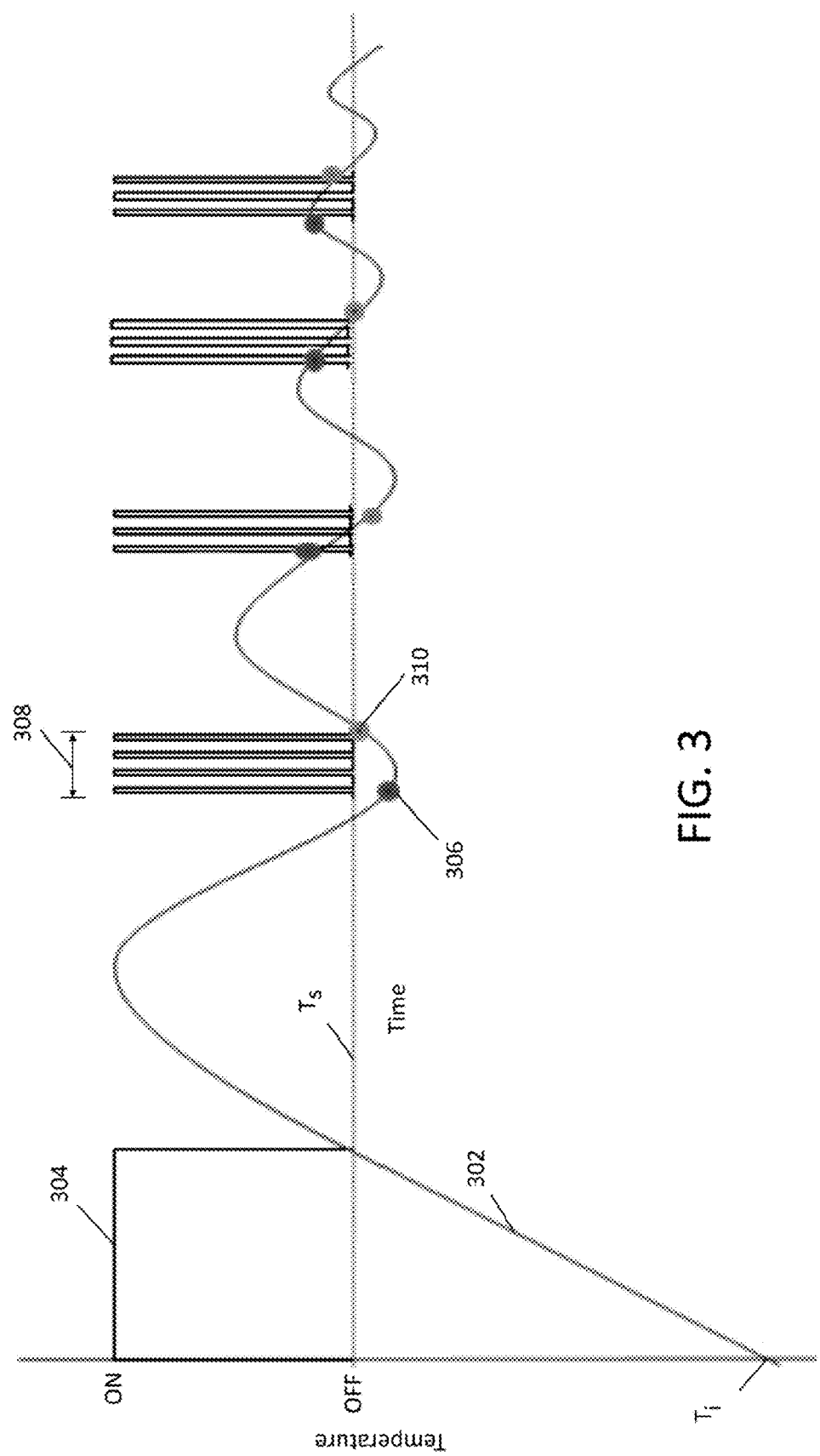
FIG. 3 is schematic representation of operation of a thermally controlled sensor device according to an embodiment.

Representative operation of controller 116 is schematically illustrated in FIG. 3, showing the operating temperature of system 100 over time in response to the control output. Here, thermal element 106 functions as a heater, such that operating temperature increases when activated, but the principles may be adapted as necessary to accommodate thermal elements that have cooling capability. Trace 302 represents the operating temperature as measured by temperature sensor 110. An initial temperature of system 100 is indicated as $T_i$ and the selected operating temperature is indicated $T_s$. Under some circumstances, such as when system 100 has been inoperative for a sufficient period of time, $T_i$ may be used to estimate current ambient temperature. Trace 304 represents the command being output by controller 116 to selectively activate thermal element 106. In this embodiment, thermal element 106 is being controlled by duty cycling the activation between "ON" and "OFF." The duty cycle may be characterized by a pulse width and frequency, which are shown as being predetermined, but either or both may be adjusted as desired. Control schemes other than duty cycling may be used, such as by varying voltage, resistance and/or current that is applied to thermal element 106 in the case of a resistive heater, or other suitable parameters if thermal element 106 has cooling capability.

As shown, an initial phase of operation may include operating thermal element 106 continuously as the operating temperature increases from $T_i$ and approaches $T_s$. Here, continuous operation of thermal element 106 ceases once $T_s$ is reached and is then subject to duty cycle operation subsequently. For example, after overshooting $T_s$ during initial heating, the operating temperature may fall to a low threshold 306 established by controller 116, such that a period of duty cycle operation 308 is triggered. Once the operating temperature rises to a high threshold 310, the duty cycling of thermal element 106 is suspended. Subsequent periods of duty cycle operation may be controlled similarly, using thresholds determined by applying the PID concepts discussed above or in any other suitable manner.

Figure 4:
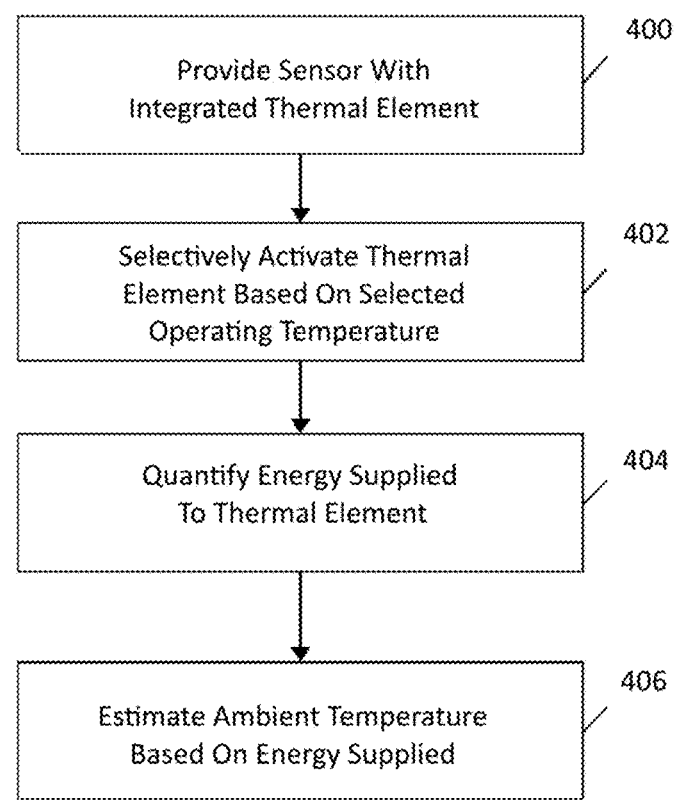
FIG. 4 is a flowchart depicting a routine for estimating ambient temperature according to an embodiment.

In one aspect, it may be desirable to estimate the current ambient temperature. For example, in addition to applying a sensor compensation that depends on the selected operating temperature, a further compensation may depend on the difference between the selected operating temperature and the current ambient temperature. For example, compensation may be changed when warranted by the difference in the selected operating temperature and the ambient temperature. Alternatively or in addition, the operating temperature may be selected from a set of predetermined operating temperatures as will be described in further detail below. Accordingly, FIG. 4 depicts a flowchart showing a representative routine for compensating a sensor. Beginning with 400, a sensor assembly including the sensor, a temperature sensor and a temperature element may be provided. In 402, an operating temperature may be selected. Based on the selected operating temperature, a first compensation may be applied to output of the sensor in 404. The compensation for the selected operating temperature may be determined by employing a suitable calibration routine during manufacture, provisioning, testing or the like. Next, in 406, the current ambient temperature may be estimated based at least in part on quantifying energy supplied to the temperature element. As will be appreciated, the amount of energy used to maintain system 100 at the selected operating temperature will be dependent on the difference between the selected operating temperature and the current ambient temperature.

In the above embodiment, quantifying the energy may include determining the length of a period of duty cycle operation, such as period 308. Since pulse width and frequency may be predetermined, the amount of energy may be calculated based on the length of the period. In embodiments that adjust pulse width and/or frequency, these values may be incorporated into the calculation. For control systems that do not utilize duty cycling, any other suitable method may be used to quantify the energy, such as by measuring the amount of current delivered. For example, the amount of current delivered during the initial heating phase shown in FIG. 3 may be used to estimate ambient temperature prior to beginning the duty cycle mode of operation. Different techniques may also be applied depending on the stage of operation. For example, an initial ambient temperature may be estimated from $T_i$ when system 100 has been inactive for a sufficient period to achieve equilibration as noted above. Other characteristics, such as the efficiency of thermal element 106, insulation properties of package 108, and other factors may be used when estimating ambient temperature as a function of the quantified energy. By employing these techniques, ambient temperature may be estimated without requiring an auxiliary temperature sensor deployed outside package 108. In turn, this reduces the complexity of system 100, avoiding the costs and power usage associated with providing the auxiliary sensor.

Further, system 100 may be calibrated at a plurality or set of operating temperatures. The set of operating temperatures may be configured to cover a range of anticipated ambient temperatures under which system 100 may operate. In general, it is desirable to utilize an operating temperature that is relatively close to ambient temperature to reduce the energy cost associated with maintaining system 100 at a temperature other than ambient. However, it is also desirable to provide a sufficient difference between the selected operating temperature and ambient temperature to allow for consistent temperature control. When ambient temperature is too close to the selected operating temperature, deactivating thermal element 106 may not cause a sufficient temperature response within the desired amount of time, delaying system 100 from reaching a temperature within an acceptable range of the selected operating temperature. Accordingly, suitable compensations may be determined for each temperature in the set of predetermined operating temperatures. Based on estimated ambient temperature, an appropriate operating temperature may be selected from the set of predetermined operating temperatures. As discussed above, ambient temperature may be estimated based on quantifying energy applied to the thermal element to maintain or achieve a temperature or from the temperature sensor prior to operation of system 100. In other embodiments, ambient temperature may also be estimated using an auxiliary temperature sensor that is deployed outside package 108.

Figure 5:
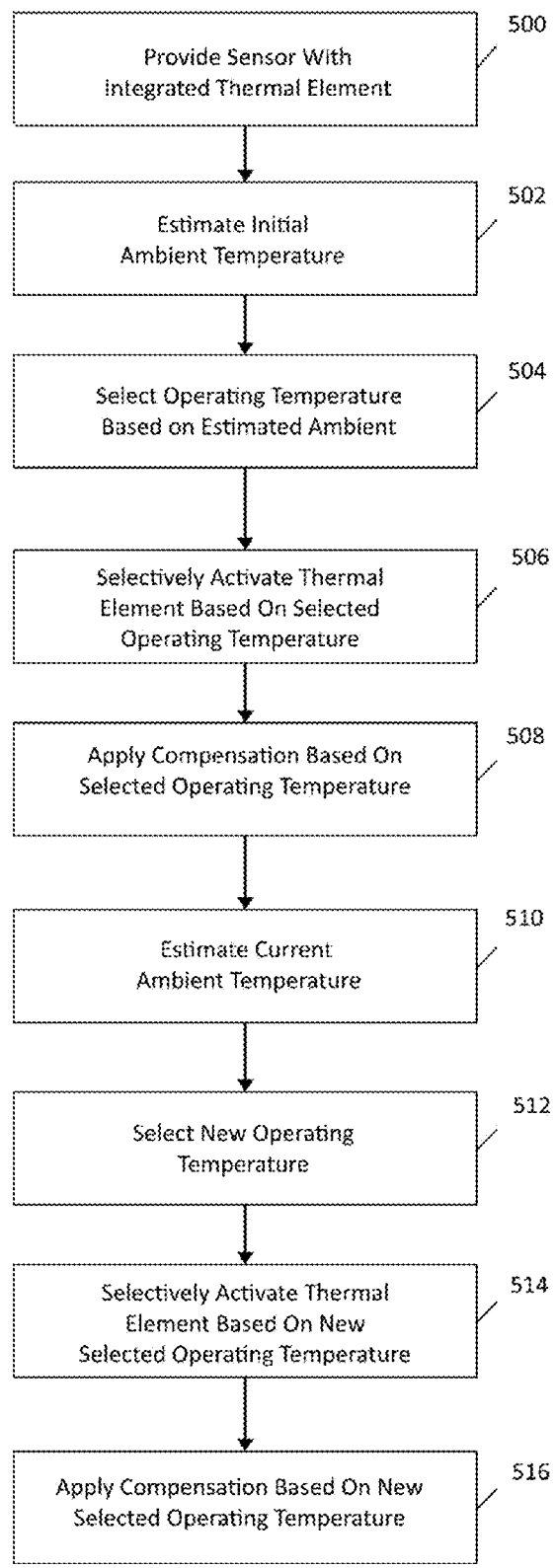
FIG. 5 is a flowchart depicting a routine for selecting among predetermined operating temperatures according to an embodiment.

To help illustrate aspects of the operation of system 100, FIG. 5 depicts a flowchart showing a representative routine for compensating a sensor. Beginning with 500, a sensor assembly including the sensor, a temperature sensor and a temperature element may be provided. In 502, the initial ambient temperature may be estimated using any of the above techniques or others. Based on the estimated ambient temperature, an operating temperature may be selected from a set of predetermined operating temperatures in 504. System 100 may have previously been calibrated at each of the predetermined operating temperatures to determine the appropriate compensations for each. As such, in 506 the temperature element may be selectively operated to drive temperature within the thermal envelope towards the selected operating temperature and in 508, a compensation corresponding to the selected operating temperature may be applied to output of the sensor. In 510, the current ambient temperature may be estimated, again by any appropriate method. For example, quantification of the energy used to maintain system 100 at the current operating temperature may be used to estimate the current ambient temperature or an auxiliary temperature sensor may be sampled. In 512, a new operating temperature may be selected from the set of predetermined operating temperatures when the current estimated ambient temperature has changed sufficiently from the initial estimated ambient temperature, such as when the current estimated ambient threshold is within a threshold of the selected operating temperature. Correspondingly, the temperature element may be selectively operated to drive temperature within the thermal envelope towards the new selected operating temperature in 514 and a compensation corresponding to the new selected operating temperature may be applied to output of the sensor in 516.

Figure 6:
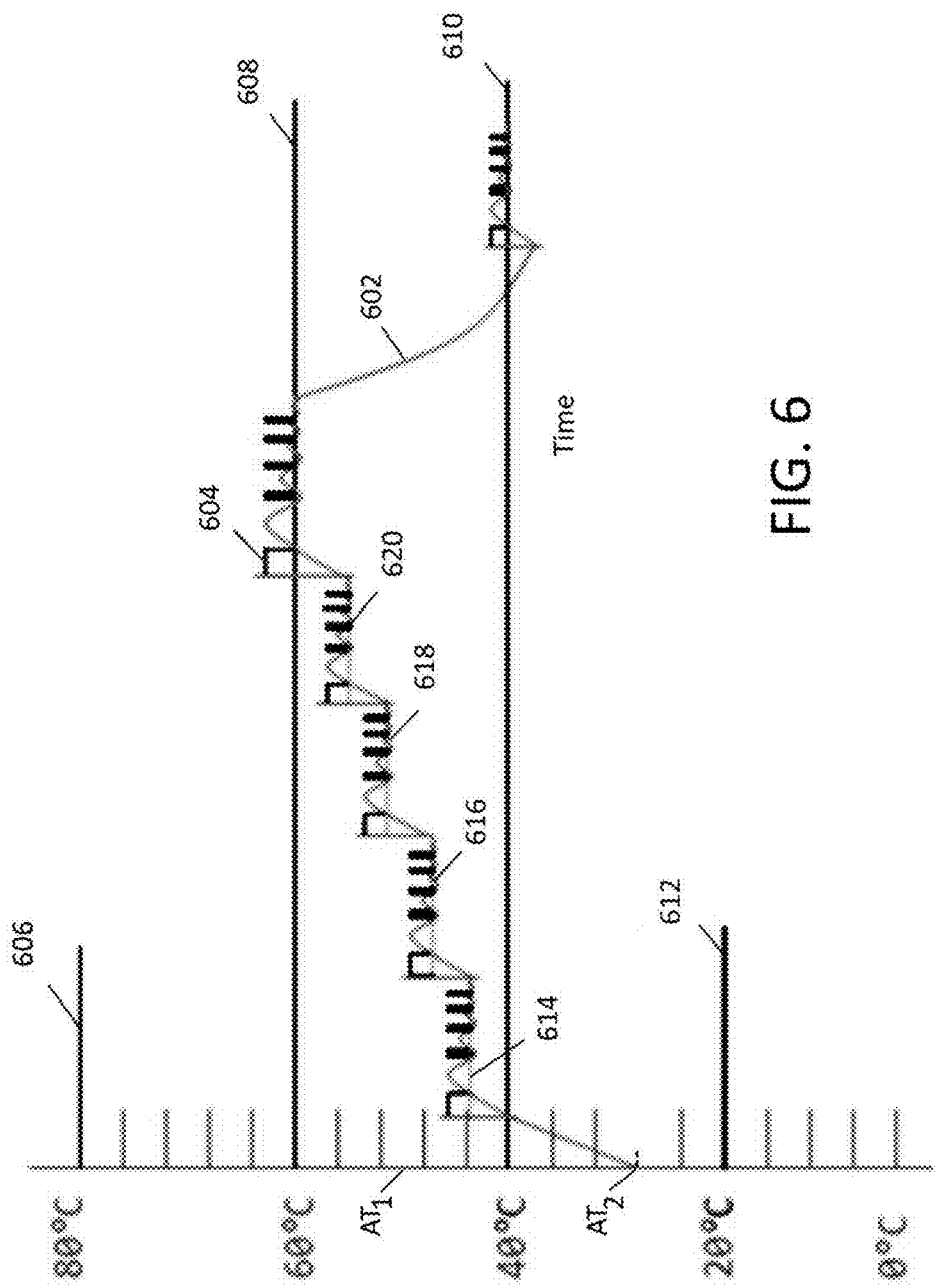
FIG. 6 is schematic representation of operation of a thermally controlled sensor device at a plurality of predetermined operating temperatures according to an embodiment.

A representative example involving the use of a set of predetermined operating temperatures is schematically shown in FIG. 6. Again, the operating temperature of system 100 is shown over time in response to the control output, with thermal element 106 configured as a heater. Trace 602 represents the operating temperature as measured by temperature sensor 110 and duty cycle operation of thermal element 106 is represented by trace 604. Predetermined operating temperatures 606, 608, 610 and 612 have been established at 80° C., 60° C., 40° C. and 20° C., respectively. As discussed above, compensations for the sensor at each of these predetermined temperatures may be established by calibration during manufacture or another stage prior to use of system 100. At a first ambient temperature, $AT_1$, controller 116 may select operating temperature 608. Accordingly, thermal element 106 is operated as indicated by trace 604 until operating temperature stabilizes around the selected operating temperature, with the understanding that some oscillation may be unavoidable given the nature of feedback control. If the ambient temperature changes, such as falling to $AT_2$, a new operating temperature 610 may be selected. Selective activation of thermal element 106 is then performed to achieve the new operating temperature, which in this example may include deactivating thermal element 106 until the operating temperature falls to a low threshold, as described above with regard to FIG. 3.

Any suitable number of predetermined operating temperatures may be employed to cover the range of anticipated environments with a desired degree of resolution. In a further aspect, one or more supplemental operating temperatures, such as operating temperatures 614, 616, 618 and 620, may be established. Supplemental operating temperatures may be used to provide a smooth transition between adjacent predetermined operating temperatures. Although system 100 may not have undergone full calibration at such supplemental operating temperatures, appropriate compensations may be determined in a number of suitable ways. For example, a compensation for a supplemental operating temperature may be calculated from one or more compensation values established for one or more of the predetermined operating temperatures. The compensation may be extrapolated or interpolated as warranted and may be estimated proportionally if the relationship is linear or by using a suitable curve fitting algorithm for a nonlinear relationship, using one or more compensation values for the predetermined operating temperatures. Similarly, if any compensation values have previously been determined for a supplemental operating temperature, these may also be used to establish compensations for other supplemental operating temperatures. Also, controller 116 may be operated to hold system 100 at one or more of the supplemental operating temperatures so that sensor output may be recorded and used to help determine the appropriate compensations. As will be appreciated, the design of system 100 with integrated thermal element 106 precludes the need for an external apparatus (e.g., an oven or refrigerator) to stabilize the operating temperature during calibration. Consequently, effective calibration may be performed at various times during and following manufacture, including when system 100 is in service, allowing it to adaptively develop new supplemental operating temperatures and determine the corresponding compensations. In turn, having multiple operating temperatures, including either or both predetermined operating temperatures and supplemental operating temperatures allows selection of an operating temperature that minimizes the difference to ambient temperature to improve temperature control and reduce power consumption, while maintaining sufficient difference to allow rapid temperature response. Employing an operating temperature that is relatively close to ambient temperature may also allow the size of thermal element 106 to be reduced.

System 100 may be incorporated into any suitable portable device or apparatus, such as a handheld or wearable device that can be moved in space by a user and its motion, location and/or orientation in space therefore sensed. For example, such a portable device may be a mobile phone (e.g., cellular phone, a phone running on a local network, or any other telephone handset), tablet, personal digital assistant (PDA), video game player, video game controller, navigation device, wearable device (e.g., glasses, watch, belt clip), fitness tracker, virtual or augmented reality equipment, mobile internet device (MID), personal navigation device (PND), digital still camera, digital video camera, binoculars, telephoto lens, portable music, video or media player, remote control, or other handheld device, or a combination of one or more of these devices. However, the techniques of this disclosure may also be applied to other types of devices that are not handheld, including autonomous or piloted vehicles whether land-based, aerial, or underwater vehicles, or equipment that may be used with such vehicles. As an illustration only and without limitation, the vehicle may be a drone, also known as an unmanned aerial vehicle (UAV). In one embodiment, the sensor may be an inertial MEMS-based sensor. For example, three gyroscopes and three accelerometers may be employed, and a sensor fusion operation performed by to combine the data. Exemplary details regarding suitable sensor configurations may be found in co-pending, commonly owned U.S. patent application Ser. No. 11/774,488, filed Jul. 6, 1007, and Ser. No. 12/106,921, filed Apr. 11, 1008, which are hereby incorporated by reference in their entirety.

As used herein, a chip may be defined to include at least one substrate typically formed from a semiconductor material. A single chip may be formed from multiple substrates, where the substrates are mechanically bonded to preserve the functionality. A multiple chip includes at least two substrates, wherein the two substrates are electrically connected, but do not require mechanical bonding. A package provides electrical connection between the bond pads on the chip to a metal lead that can be soldered to a PCB. A package typically comprises a substrate and a cover. Integrated Circuit (IC) substrate may refer to a silicon substrate with electrical circuits, typically CMOS circuits. One or more sensors may be incorporated into the package if desired using any suitable technique. In some embodiments, a sensor may be MEMS-based, such that a MEMS cap provides mechanical support for the MEMS structure. The MEMS structural layer is attached to the MEMS cap. The MEMS cap is also referred to as handle substrate or handle wafer. In some embodiments, the first substrate may be vertically stacked, attached and electrically connected to the second substrate in a single semiconductor chip, while in other embodiments, the first substrate may be disposed laterally and electrically connected to the second substrate in a single semiconductor package. In one embodiment, the first substrate is attached to the second substrate through wafer bonding, as described in commonly owned U.S. Pat. No. 7,104,129, which is incorporated herein by reference in its entirety, to simultaneously provide electrical connections and hermetically seal the MEMS devices. This fabrication technique advantageously enables technology that allows for the design and manufacture of high performance, multi-axis, inertial sensors in a very small and economical package. Integration at the wafer-level minimizes parasitic capacitances, allowing for improved signal-to-noise relative to a discrete solution. Such integration at the wafer-level also enables the incorporation of a rich feature set which minimizes the need for external amplification.

The techniques of this disclosure have the potential to provide a number of benefits. For applications involving autonomous vehicles,), it essential to have sensors such as a gyroscope be very predictable to provide adequate navigation and control. Variations in sensor output due to temperature have been a major obstacle. Existing solutions typically provide accuracies within about 3° with settling times on the order of two to three minutes. In comparison, the techniques of this disclosure may provide accuracies within about 0.1° with settling times of less than one minute. Further, by providing a set of predetermined operating temperatures, system 100 may readily adapt to changes in ambient temperature.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the present invention.

What is claimed is:

1. A method for compensating a sensor, comprising:
providing a sensor assembly including the sensor, a temperature sensor and a temperature element contained within a thermal envelope;
selecting an operating temperature;
selectively activating the temperature element to drive temperature within the thermal envelope towards the selected operating temperature;
applying a first compensation to an output of the sensor based at least in part on the selected operating temperature and
estimating current ambient temperature based at least in part on quantifying energy supplied to the temperature element.

2. The method of claim 1, further comprising determining a difference between the selected operating temperature and the estimated current ambient temperature and applying a second compensation to the output of the sensor based at least in part on the determined difference between selected operating temperature and estimated current ambient temperature.

3. The method of claim 1, further comprising selectively activating the temperature element to compensate for hysteresis.

4. The method of claim 1, wherein selectively activating the temperature element comprises operating the temperature element at a duty cycle.

5. The method of claim 4, wherein quantifying energy supplied to the temperature element comprises characterizing the duty cycle.

6. The method of claim 1, wherein quantifying energy supplied to the temperature element comprising quantifying energy delivered to maintain the thermal envelope at the operating temperature.

7. The method of claim 1, further comprising estimating an initial ambient temperature based at least in part on an output from the temperature sensor prior to selectively activating the temperature element.

8. The method of claim 7, further comprising selecting the operating temperature based at least in part on the estimated initial ambient temperature.

9. The method of claim 1, further comprising selecting the operating temperature based at least in part on the estimated current ambient temperature.

10. The method of claim 1, wherein the operating temperature is selected from a set of predetermined temperatures.

11. The method of claim 10, further comprising changing from a first operating temperature to a second operating temperature when the estimated current ambient temperature is within a threshold of the first operating temperature.

12. The method of claim 10, further comprising determining compensations to be applied to a motion sensor output for each temperature of the set of predetermined temperatures.

13. The method of claim 10, further comprising selectively activating the thermal element to drive temperature within the thermal envelope towards a supplemental operating temperature.

14. The method of claim 13, further comprising performing a calibration routine at the supplemental operating temperature to determine a compensation for the supplemental operating temperature.

15. The method of claim 14, further comprising applying the compensation for the supplemental operating temperature to the output of the sensor.

16. The method of claim 14, further comprising performing calibration routines at a plurality of supplemental operating temperatures to determine compensations for each of the supplemental operating temperatures.

17. The method of claim 1, wherein the thermal element is selected from the group consisting of a heating element, a cooling element and a heating and cooling element.

18. The method of claim 1, wherein the sensor is an inertial sensor.

19. The method of claim 1, wherein the sensor is implemented using a micro electro-mechanical system (MEMS).

20. A sensor device comprising:
a sensor assembly including a sensor,
a temperature sensor and a temperature element contained within a thermal envelope; and
a controller configured to:
select an operating temperature;
selectively activate the temperature element to drive temperature within the thermal envelope towards the selected operating temperature;
apply a first compensation to an output of the sensor based at least in part on the selected operating temperature; and
estimate current ambient temperature based at least in part on quantifying energy supplied to the temperature element.

* * * * *